United States Patent
Fife et al.

(10) Patent No.: US 7,603,316 B1
(45) Date of Patent: Oct. 13, 2009

(54) MESSAGE DELIVERY DELEGATE SYSTEM AND METHOD

(75) Inventors: John P Fife, Scottsdale, AZ (US); Lawrence S. Hoffman, Scottsdale, AZ (US); Rafael T Perez, Glendale, AZ (US); Michael E Rice, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 763 days.

(21) Appl. No.: 10/908,904

(22) Filed: May 31, 2005

Related U.S. Application Data

(60) Provisional application No. 60/624,405, filed on Nov. 1, 2004.

(51) Int. Cl.
  *G06Q 40/00* (2006.01)
(52) U.S. Cl. .......................................... 705/44; 705/14
(58) Field of Classification Search .............. 705/10–44
  See application file for complete search history.

(56) References Cited

U.S. PATENT DOCUMENTS

| | | | | |
|---|---|---|---|---|
| 7,058,817 | B1 * | 6/2006 | Ellmore | 713/183 |
| 7,177,834 | B1 * | 2/2007 | Maestle | 705/38 |
| 7,233,929 | B1 * | 6/2007 | Lingle et al. | 705/402 |

OTHER PUBLICATIONS

Ionna Manolescu et al., "Model-Driven and Deployment of Service-Enabled Web Applications", ACM Transactions on Internet Technology, vol. 5, No. 3, Aug. 2005, pp. 439-479.*
Reiner Kraft, "Designing a Distributed Access Control Processor for Network Services on the Web", ACM Working on XML Security, Nov. 22, 2002, Fiarfax VA USA.*
Bhuvam Urgaonkar, "Analytic Modeling of Multitier Internet Applications", ACM Transactions on the Web, vol. No. 1, Article 2, Publicatins date May 2007.*

* cited by examiner

*Primary Examiner*—Frantzy Poinvil
(74) *Attorney, Agent, or Firm*—Fitzpatrick, Cella, Harper & Scinto

(57) ABSTRACT

The present invention provides major improvement with respect to electronic transaction reporting and processing by providing advance asynchronous confirmation of a transaction to a consumer while a proxy system processes the consumer submitted transaction through to completion or failure through synchronous handoff, persistent retry logic, and exception processing.

17 Claims, 2 Drawing Sheets

MESSAGE DELIVERY DELEGATE SYSTEM AND METHOD

CROSS-REFERENCE TO RELATED APPLICATIONS

This application claims benefit from, and priority to, U.S. Provisional Patent Application Ser. No. 60/624,405, filed Nov. 1, 2004, which is hereby incorporated by reference in its entirety.

FIELD OF INVENTION

The present invention generally relates to a system and method for facilitating asynchronous confirmation of a transaction to a consumer while a message persistence mechanism pursues the transaction to completion or failure.

BACKGROUND OF INVENTION

Applications or client servers that host various business capabilities (e.g., merchant websites, online checkouts, and transaction environments) frequently get backlogged or go offline and occasionally crash. Consumers interfacing with such business capability systems demand confirmation of transactions and assurance that the transactions will proceed to completion without delay, despite such complications. Without guarantee processing, consumers must wait for a completion or failure response from the business capability. In prior art systems, guarantee processing required that the individual clients or merchants managed and monitored exception processing and completed balancing of transaction records sent against transaction records processed. Accordingly, there is a need for a central system and method for providing real-time confirmation of a transaction and for ensuring that the transaction proceeds to completion.

SUMMARY OF INVENTION

In general, the present invention comprises a message delivery delegate system that facilitates the centralized, end-to-end management (or any portion thereof) of a transaction. The system includes retry logic and balancing and exception processing capabilities that provide persistent processing through to completion or failure of the transaction, with minimal or no delay to a consumer. This system further reduces or eliminates the need for individual clients to monitor their own balancing and exception processing.

In an embodiment, the message delivery delegate system resides between a consumer and respective business capabilities, acting as a proxy for the consumer. The delegate system generates a proxy message containing all the information from the consumer that is necessary or desired to complete a transaction, then reports to the consumer that the transaction is confirmed (i.e., that the proxy message has been validated as sufficient for the transaction to proceed to completion). If the delegate system is initially unsuccessful in processing the transaction relating to a business capability, a message persistence mechanism facilitates resubmission of the proxy message to the business capability until the transaction is completed or until the proxy message "times out" (i.e., exceeds a set time or number or retries allowed, or otherwise exceeds certain parameters).

An exemplary method according to one embodiment of the invention includes verifying transaction information submitted by a party based upon the requirements of a business application (e.g., sufficiency and formatting of submitted information) and reporting that the information is sufficient or lacking. If sufficient, the system then pursues the transaction with the business application to completion or failure with a persistence mechanism and optionally reports the completion or failure to the party or business application.

BRIEF DESCRIPTION OF THE DRAWINGS

Additional aspects of the present invention will become evident upon reviewing the non-limiting embodiments described in the specification and the claims taken in conjunction with the accompanying figures, wherein like reference numerals denote like elements.

DETAILED DESCRIPTION

Figure 1:
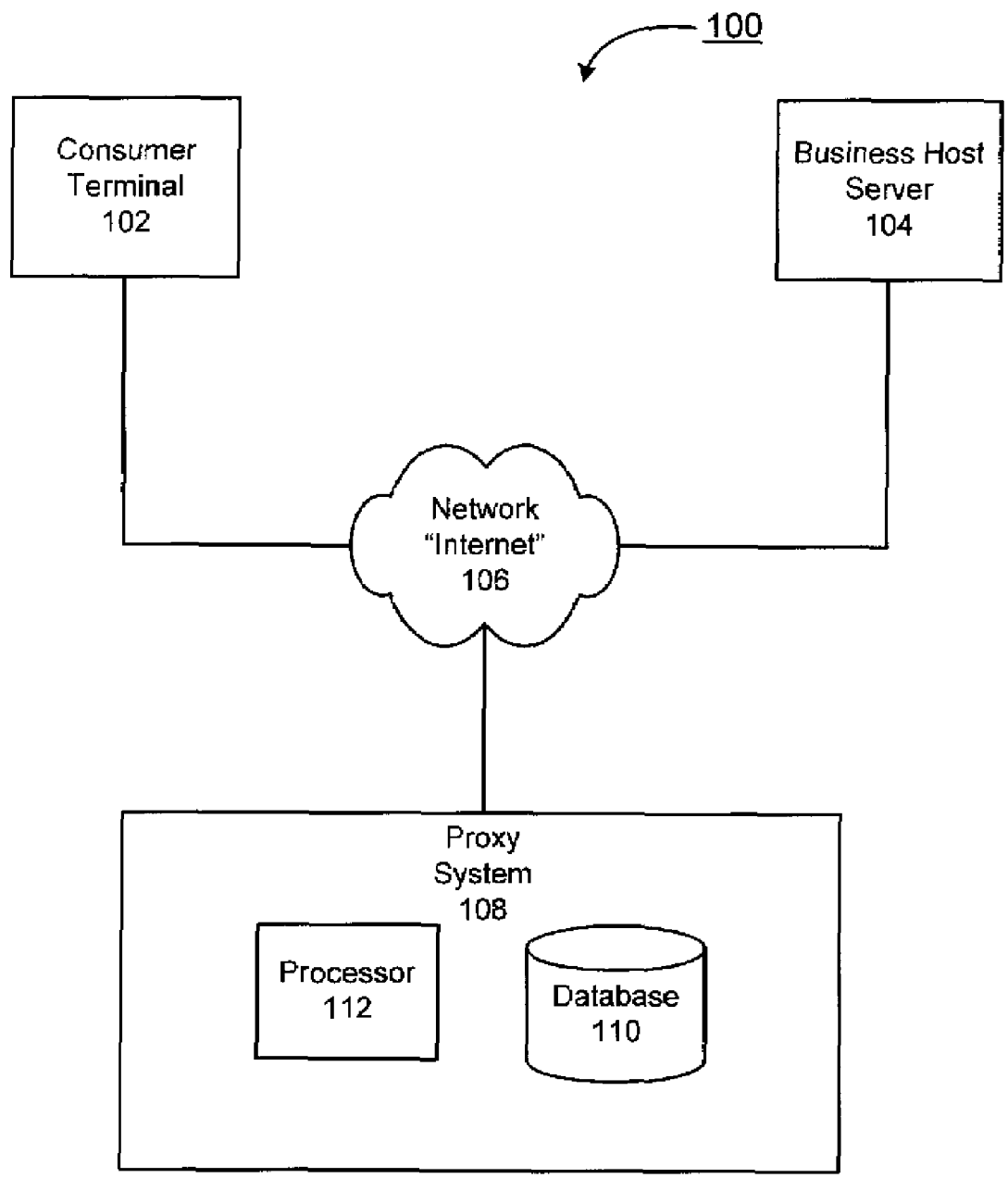
FIG. 1 is a diagram of exemplary system components.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In general, the invention is any message delivery delegate system or proxy system that facilitates substantially real-time confirmation to a first party to a transaction upon entry of sufficient information. The system further pursues the transaction with a second party to completion or failure through retry logic and exception processing. This allows the first party (e.g., consumer) to be channel independent and to receive asynchronous advanced confirmation through combined synchronous handoff and persistent retry logic processes. Channel independence allows consumers to communicate with a Message Delivery Delegate (MDD) independent of what communication channel is enabled for the business capability (e.g., message queue ("MQ"), web service, remote/remove method invocation ("RMI"), etc.). This system may be implemented in any message oriented infrastructure. The invention provides improved customer service, reduced response time, improved quality of data, reduced possibility of missing data and reduced costs because individual clients do not need to implement failure processing. The invention also increases the quality and performance of existing services, reduces errors, and lowers cost of any asynchronous update.

A typical transaction involves a consumer using a computer to access a business application host server. Various applications on the host server typically request that a consumer complete data fields or otherwise provide certain information to facilitate a transaction. Payment information, shipping information, subscription information, or the like may thus be requested, processed, and verified. The system is invoked as a consumer proxy between the consumer computer and the business host server over a network, such as the internet. Alternatively, the system may be incorporated into any number of systems, including the consumer computer and/or business host server.

The proxy system, once invoked, accepts consumer input of transaction information requested by the business application (i.e., business capability) and stores the information in a message on the proxy system. Because the transaction information is stored separately in a proxy system message, a business server crash, data loss, or business server back-end processing delay will not necessarily terminate the transaction because the proxy system will continue to retry the stored transaction. Once the information is stored in the proxy system, the proxy system then verifies that all required information has been inputted in the proper format.

In one embodiment, verification is performed by comparing the stored information to business application information and format requirements. For example, information such as a credit card number, expiration date, birth date, address, phone number or the like, may be acceptable for processing by a business application only if it is complete (i.e., all required fields are filled), and if it conforms to preset formats. Preset formats may require a particular order (e.g. day/month/year vs. month/day/year), particular character attributes (e.g. case sensitive), numbers of characters (e.g. a complete account number), or presence or absence of certain symbols or punctuation (e.g. numbers only, lack of hyphens in phone numbers or improper file name characters). Incomplete or incorrect information triggers an error message response to the consumer. The error message may identify any deficiencies in the submitted information. If needed, the consumer may then correct or supplement the information to resubmit to the proxy system.

Upon verification that submitted information is complete and correctly formatted, whether by interrogation of the business application or otherwise, the system returns a transaction confirmation to the consumer. In one embodiment, the transaction confirmation includes a confirmation or transaction reference number and additional information such as, for example, the identity of the parties to the transaction, a transaction start time stamp, an estimated shipping date, summary of charges, a description of the requested product or service, party contact information, or any other transaction associated information. The confirmation may also contain a return code and message to identify success, warnings or errors that the MDD returns about the message.

The proxy system ensures that the transaction proceeds to completion or to any predetermined point in the transaction. The proxy system attempts to process the transaction via the business application, but if unsuccessful, message persistence mechanisms ensure that the transaction is retried until the transaction is completed or until it exceeds allowable parameters, (e.g., number of attempts or elapsed time). If a transaction attempt exceeds these parameters, the transaction is logged to a failure queue and an alert is generated for further investigation.

Turning now to the drawings, FIG. 1 shows an exemplary transaction system 100 comprising a consumer terminal 102, a business host server 104 and a message delivery delegate server (i.e., proxy system 108) in communication over a network 106. Proxy system 108 includes a database 110 and a processor 112. Database 110 includes various data tables and logs. For example, data tables include the information input from the consumer and the format requirements for the business application. Additional fields or tables include logs of transaction confirmations, attempts, failures, and completion details. Programming stored on proxy system 108 facilitates data input to and storage on database 110. Additional programming provides persistence mechanisms (e.g., retry logic and exception processing), failure processing, and reporting of successful and failed transactions.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. Computer systems may include any suitable personal computer, network computer, workstation, minicomputer, mainframe or the like, with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, offline communications, wireless communications, transponder communications, local area network (LAN), wide area network (WAN), networked or linked devices, keyboard, mouse and/or any suitable communication or data input modality. The invention may be implemented with TCP/IP communications protocols, or IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

As used herein, "transmit" includes sending electronic data from one system component to another over a network connection. Additionally, as used herein, "data" includes encompassing information such as commands, queries, files, data for storage, and the like in digital or any other form.

The invention contemplates uses in association with web services, utility computing, pervasive and individualized computing, security and identity solutions, autonomic computing, commodity computing, mobility and wireless solutions, open source, biometrics, grid computing and/or mesh computing.

Any databases discussed herein may include relational, hierarchical, graphical, object-oriented, and/or other suitable structures. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB are configured or configurable to indicate the status of that particular data set; e.g., LOADED, INITIALIZED, READY, BLOCKED, REMOVABLE, or DELETED. Subsequent bytes of data may be used to indicate, for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The present invention may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stockquotes/ge) and an IP address (123.56.789). The web server retrieves the appropriate web pages and sends the data or applications for the web pages to the IP address. Web services are applications that are capable of interacting with other applications over a communications means, such as the internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

The present invention may be described herein in terms of functional block components, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), or J2EE with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "consumer", "customer", "card member", "user", "business" or "merchant" may be used interchangeably with each other, and each shall mean any person, entity, machine, hardware, software or business. Additionally, any financial institution, such as banks, credit card companies, card sponsoring companies, or third party issuers under contract with financial institutions may be parties to transactions. It is further noted that other participants may be involved in some phases of the transaction, such as an intermediary settlement institution, but these participants are not shown.

Each participant is equipped with a computing device in order to interact with the system and facilitate online commerce transactions. The consumer has a computing unit in the form of a personal computer, although other types of computing units may be used including laptops, notebooks, hand held computers, set-top boxes, cellular telephones, touch-tone telephones and the like. The merchant business has a computing unit implemented in the form of a computer-server, although other embodiments are contemplated by the invention. The computing unit may be implemented in other forms, such as a main frame computer, mini-computer, a PC server, a network of computers located in the same or different geographic locations, or the like. Moreover, the system contemplates the use, sale or distribution of any goods, services or information over any network having similar functionality described herein The merchant computer and the proxy system may be interconnected via a second network, referred to as a transaction network. The transaction network which may be part of certain transactions represents existing proprietary networks that presently accommodate transactions for charge cards, credit cards, debit cards, and other types of financial/banking cards. The transaction network is a closed network that is assumed to be secure from eavesdroppers. Exemplary transaction networks include the American Express®, VisaNet® and the Veriphone® networks.

The electronic transaction proxy system may be implemented at the customer and/or merchant computing terminal. In an exemplary embodiment, the electronic transaction proxy system is implemented as computer software modules loaded onto the customer computer and/or the merchant computing center. In an alternative embodiment, neither computer requires any additional software to participate in the online transactions supported by the proxy system.

Consumer information as used herein, may include any device, code, number, letter, symbol, digital certificate, smart chip, digital signal, analog signal, biometric or other identifier/indicia suitably configured to allow the consumer to access, interact with or communicate with the system. Consumer information may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a fob having a transponder and RFID reader in RF communication with the fob. Although the present invention may include a fob embodiment, the invention is not to be so limited. Indeed, the system may include any device having a transponder which is configured to communicate with RFID reader via RF communication. Typical devices include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

The consumer information including account numbers may be distributed and stored in any form of plastic, electronic, magnetic, radio frequency, wireless, audio and/or optical device capable of transmitting or downloading data from itself to a second device. A merchant account number may be, for example, any number or alpha-numeric characters that identify a particular merchant for purposes of card acceptance, account reconciliation, reporting, or the like.

As will be appreciated by one of ordinary skill in the art, the present invention may be embodied as a customization of an existing system, an add-on product, upgraded software, a stand alone system, a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Figure 2:
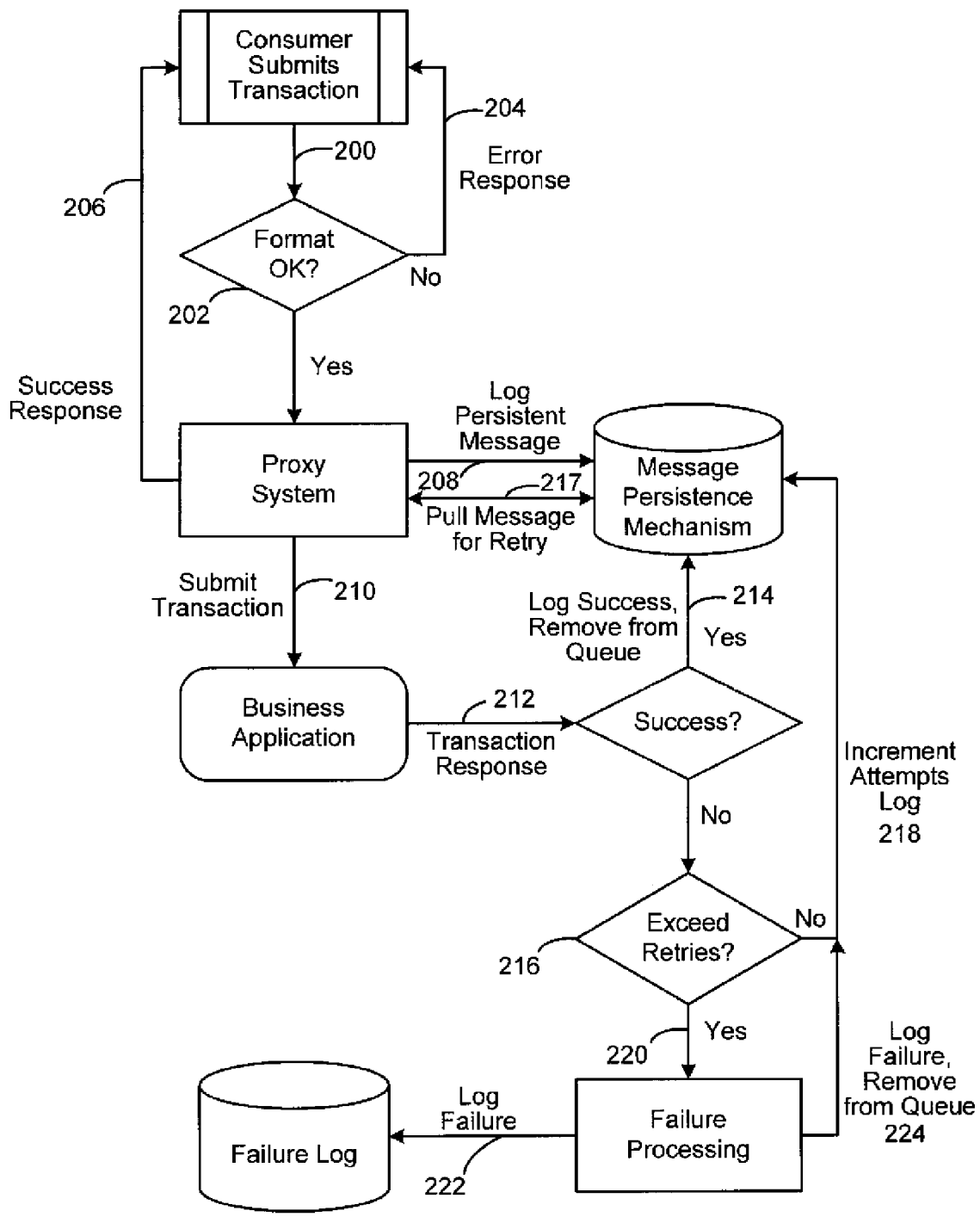
FIG. 2 is a flow diagram listing exemplary processes of a proxy system that implements a message delivery delegate scheme according to an embodiment of the present invention.

Returning to the drawings, FIG. 2 shows a flow diagram of exemplary proxy system processes. The consumer submits the transaction or transaction information to the message delivery delegate (i.e., proxy system 108) using, for example, any message oriented or other suitable infrastructure. (Step 200) Proxy system 108 then generates a proxy message and verifies the sufficiency of the content and format of the message by querying the business application or by referencing stored business application requirements from prior transactions. (Step 202) Similarly, the sufficiency of content or format may be verified using a rules engine, pre-defined template documentation, or using XML Document Type Definitions (DTDs). The proxy system returns an error response to the consumer if the message verification is not successful, (e.g., the message is partially or fully not readable or incomplete). (Step 204) The proxy system returns a success response or transaction confirmation to the consumer if the message is successfully verified (e.g., partially or fully readable and complete). (Step 206)

Once the proxy message is verified, a persistence message is logged and queued in a message persistence mechanism. (Step 208) The message persistence mechanism maintains a queue of messages associated with pending transactions. The message persistence mechanism may also maintain a retry counter and provide auditing and reporting functionalities. The message persistence mechanism can include any process used to persist data beyond initial program loading ("IPL"), reboots, etc. That is, the message is written to a non volatile media such as a file system or non-volatile RAM using various mechanisms such as a database, direct file I/O to a file system, MQ persistent queues, or direct I/O to non-volatile RAM. It should be understood that any persistence mechanism now existing or later developed in the art may be used with the invention.

The transaction or proxy message is then submitted to the business application associated with the queued message. (Step 210) The association between a queued message and the corresponding business application may be established upon invocation of the proxy system, upon submission of transaction information, or at any other suitable time or by any suitable means. In an embodiment, the business application transaction response is repeatedly interrogated, but at least once for each transaction attempt. (Step 212) The transaction is maintained in the persistent queue for retry processing until successfully completed. A successful transaction response is logged in the message persistence mechanism, prompting the system to remove the proxy message from the persistent queue. (Step 214) Each unsuccessful transaction attempt is checked against preset allowable system parameters such as, for example, elapsed time or a maximum number of retries. Additional parameters or factors may include SOR rejections (i.e., correct format but unfulfillable due to SOR business rules), line of business (e.g., consumer, corporate, small business), high value customer indicators, and/or SOR policy changes (e.g., requested transaction was previously permitted or allowable, etc.). (Step 216) The proxy system retries or resubmits unsuccessful transactions queued in the message persistence mechanism at various intervals (e.g., scheduled, random, increasing, decreasing or any other period). (Step 217) The message persistence mechanism incrementally logs each unsuccessful transaction attempt until the transaction exceeds allowable parameters or is otherwise removed from the persistent queue. (Step 218) Exceeding the allowable number of retries or other parameters invokes failure processing. (Step 220) In failure processing, the failure is recorded in a failure log within the proxy system database (Step 222) and the transaction is removed from the persistent queue. (Step 224) Alerts may be optionally sent to any component or participant in the system such as, for example, the business application, proxy server administrator and/or the consumer.

Proxy system applications may run "behind" business applications such that any transaction initiated by a consumer invokes the proxy system. Referring again to step 200, consumer information may be manually input by the consumer or may be automatically input from a consumer's virtual wallet, from a financial instrument such as a smart card, or by any other suitable means. In step 202, the proxy system may query the business application as to the required information and format or may store such requirements for reference within the proxy system.

In one embodiment, the error response delivered to the consumer in step 204 instructs the consumer to provide additional information or to properly format previously-submitted information. The transaction confirmation message received by the consumer in step 206 includes a confirmation number supplied by the business application and/or one generated by the proxy system. Transactions are categorized within the proxy system to provide different treatment or different priority to different categories. For example, transactions may be categorized according to the dollar value of the transaction or to any other distinguishing factor. A higher priority category of transactions may be retried or resubmitted more frequently or more times total than a lower priority transaction. Preset parameters may be used in step 216 to limit the amount of time or the number of times that a particular transaction remains valid. Upon expiration of the allowable transaction time or allowable transaction retries in step 216, the proxy system delivers an error message to at least one party to the transaction for investigation.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Practitioners will appreciate that the illustrated steps described herein may comprise in any number of configurations including the use of windows, web pages, web forms, popup windows, prompts and the like. It should be further appreciated that the multiple steps as illustrated and described may be combined into single steps but have been expanded for the sake of simplicity. In other cases, steps illustrated and described as single process steps may be separated into multiple steps but have been combined for simplicity.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. As used herein, the terms "includes", "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A transaction confirmation apparatus comprising a processor and a memory storing a program executable by said processor, wherein said program includes computer code for implementing a method to facilitate asynchronous transaction confirmation and processing utilizing a message delivery delegate, wherein said method includes steps of:
    receiving, at a host computer, transaction information from a party, said transaction information related to a transaction;
    verifying said transaction information based upon requirements of a business application;
    reporting said verification of said transaction information prior to completion of said transaction as at least one of an error message and a transaction confirmation message to said party; and
    pursuing said transaction with a persistence mechanism to at least one of completion and failure, wherein said step of pursuing said transaction includes:
    submitting said transaction information to said business application,
    querying said business application for a transaction response,
    logging said transaction information in a persistent message queue,
    repeating said steps of submitting said transaction information to said business application and querying said business application for a transaction response until said transaction information is removed from said persistent message queue, and
    removing said transaction information from said persistent message queue following at least one of a successful transaction response and expiry of preset failure parameters.

2. The apparatus of claim 1, wherein said step of verifying said transaction information comprises confirming at least one of a sufficiency of said transaction information and formatting of said transaction information based upon said requirements of said business application.

3. The apparatus of claim 1, wherein said expiry of preset failure parameters includes expiry of at least one of an allowable transaction attempt duration and an allowable maximum number of retry attempts.

4. The apparatus of claim 1, wherein the method further includes a step of reporting at least one of a failed transaction response and said successful transaction response to at least one of said party and said business application.

5. The apparatus of claim 1, wherein said step of reporting said verification occurs substantially in real-time.

6. The apparatus of claim 1, wherein said step of pursuing said transaction further includes incrementing an attempt log following an unsuccessful persistent message submission.

7. The apparatus of claim 1, wherein said step of pursuing said transaction further includes logging at least one of a failed transaction response and said successful transaction response.

8. A computer-readable medium having stored thereon code that, when executed by a computer, causes said computer to perform a transaction confirmation method comprising steps of:
   receiving, at a host computer, transaction information from a party, said transaction information related to a transaction;
   verifying said transaction information based upon requirements of a business application;
   reporting said verification of said transaction information prior to completion of said transaction as at least one of an error message and a transaction confirmation message to said party; and
   pursuing said transaction to at least one of completion and failure with a persistence mechanism, wherein said step of pursuing said transaction includes:
      submitting said transaction information to said business application,
      querying said business application for a transaction response,
      logging said transaction information in a persistent message queue,
      repeating said steps of submitting said transaction information to said business application and querying said business application for a transaction response until said transaction information is removed from said persistent message queue, and
      removing said transaction information from said persistent message queue following at least one of a successful transaction response and expiry of preset failure parameters.

9. The medium of claim 8, wherein said step of verifying said transaction information comprises confirming at least one of a sufficiency of said transaction information and formatting of said transaction information based upon said requirements of said business application.

10. The medium of claim 8, wherein said expiry of preset failure parameters includes expiry of at least one of an allowable transaction attempt duration and an allowable maximum number of retry attempts.

11. The medium of claim 8, wherein said method further comprises reporting at least one of a failed transaction and said successful transaction response to at least one of said party and said business application.

12. The medium of claim 8, wherein said step of reporting said verification occurs substantially in real-time.

13. The medium of claim 8, wherein said step of pursuing said transaction further includes incrementing an attempt log following an unsuccessful persistent message submission.

14. The medium of claim 8, wherein said step of pursuing said transaction further includes logging at least one of a failed transaction response and said successful transaction response.

15. A host system for facilitating asynchronous transaction confirmation and processing utilizing a message delivery delegate, said host system comprising at least one processor programmed to:
   receive transaction information from a party, said transaction information related to a transaction;
   verify said transaction information based upon requirements of a business application;
   transmit a transaction confirmation message to said party prior to completion of said transaction; and
   pursue said transaction to at least one of completion and failure, using persistent message retry logic and exception processing, wherein said persistent message retry logic includes a software module configured to:
      place said transaction information in a message queue creating queued transaction information,
      periodically resubmit said queued transaction information to corresponding said business application,
      query said business application for a transaction response,
      log at least one of a successful and a failed transaction based upon said queued transaction information, and
      remove said transaction information from said message queue upon logging of at least one of a successful transaction and a failed transaction.

16. The system of claim 15, wherein said at least one processor is further programmed to report said at least one of a successful transaction and a failed transaction to at least one of said party and said business application.

17. The system of claim 15, wherein said transaction information is verified and said transaction confirmation message is reported substantially in real-time.

* * * * *

UNITED STATES PATENT AND TRADEMARK OFFICE
CERTIFICATE OF CORRECTION

| | | |
|---|---|---|
| PATENT NO. | : 7,603,316 B1 | Page 1 of 1 |
| APPLICATION NO. | : 10/908904 | |
| DATED | : October 13, 2009 | |
| INVENTOR(S) | : John P. Fife et al. | |

It is certified that error appears in the above-identified patent and that said Letters Patent is hereby corrected as shown below:

Title Page
[56] REFERENCES CITED

Other Patent Documents:
    "Fiarfax VA USA*" should read --Fairfax, VA USA*--.
    "Publicatins" should read --Publications--.

[75] INVENTORS

"John P Fife, Scottsdale, AZ (US); Lawrence S. Hoffman, Scottsdale, AZ (US);
    Rafael T Perez, Glendale, AZ (US); Michael E Rice, Phoenix, AZ (US)" should
    read --John P. Fife, Scottsdale, AZ (US); Lawrence S. Hoffman, Scottsdale, AZ (US);
    Rafael T. Perez, Glendale, AZ (US); Michael E. Rice, Phoenix, AZ (US)--.

COLUMN 6

Line 12, "binary" should read --binary information--.

COLUMN 10

Line 9, "non volatile" should read --non-volatile--.

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO.      : 7,603,316 B1                              Page 1 of 1
APPLICATION NO. : 10/908904
DATED           : October 13, 2009
INVENTOR(S)     : Fife et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1139 days.

Signed and Sealed this

Fifth Day of October, 2010

David J. Kappos
*Director of the United States Patent and Trademark Office*